United States Patent [19]

Groszstück

[11] 4,344,780
[45] Aug. 17, 1982

[54] APPARATUS FOR THE SEPARATION OF FLUIDS

[75] Inventor: Werner Groszstück, Pforzheim, Fed. Rep. of Germany

[73] Assignee: Nustep Trenndüsen Entwicklungs- und Patentverwertungsgesellschaft mbH & Co. KG, Essen, Fed. Rep. of Germany

[21] Appl. No.: 230,105

[22] Filed: Jan. 29, 1981

[30] Foreign Application Priority Data

Jan. 30, 1980 [DE] Fed. Rep. of Germany ....... 3003266

[51] Int. Cl.$^3$ ............................................. B01D 53/24
[52] U.S. Cl. .......................................... 55/347; 55/17; 55/348; 55/397; 55/461
[58] Field of Search ................... 55/397, 392, 461, 17, 55/344, 346–348

[56] References Cited

U.S. PATENT DOCUMENTS 3,362,131  1/1968  Becker .................................. 55/17
3,668,080  6/1972  Weber et al. ...................... 55/17 X
3,708,964  1/1973  Becker et al. ..................... 55/17 X
4,033,021  7/1977  Tybus et al. ....................... 55/17 X

FOREIGN PATENT DOCUMENTS 1198328  4/1966  Fed. Rep. of Germany .
2419192  2/1977  Fed. Rep. of Germany .

Primary Examiner—Kathleen J. Prunner
Attorney, Agent, or Firm—Karl F. Ross

[57] ABSTRACT

An apparatus for the separation of components of a fluid (gas or vapor) by mass difference, especially for the enrichment of a particular isotopic component in the fluid, e.g. in uranium enrichment, comprises a block of generally rectangular plane configuration formed with passages for the fluid separated by partitions. Adjacent each partition is a row of slots through which the fluid passes for deflection by a nozzle-forming baffle and partial interception by a peel-off or skimming baffle which deflects the selected portion of the stream inwardly through slots of a passage on the opposite side of the partition. The passages are alternately closed and open along opposite walls of the passage block and the baffles overhang the respective rows of slots while being mounted on seating ledges extending parallel to the rows and formed in outer surfaces of the block.

5 Claims, 4 Drawing Figures

APPARATUS FOR THE SEPARATION OF FLUIDS

FIELD OF THE INVENTION

My present invention relates to an apparatus for the separation of fluids, namely, gases and vapor-phase fluids, especially fluid mixtures containing components differing in mass. The invention is especially directed to an improved method of separating isotopes, or for enriching a fluid stream in one isotopic component, e.g. in uranium enrichment utilizing, for example, the isotope mixture in the form of compounds in a gas phase.

BACKGROUND OF THE INVENTION

In the separation of components of a gas or vapor mixture by mass, especially in isotope separations such as the separation of uranium isotopes, it is known to transform the element whose isotopes are to be separated into a gas phase and to effect the separation by the preferential enrichment of the gas stream in the compounds of one of the isotopes, thereby separating to a greater or lesser extent compounds of two or more isotopes from one another.

In the case of uranium, for example, the uranium can be converted to the uranium hexafluoride, which is in a gas or vapor form and a gas stream containing mixtures of uranium hexafluorides of the uranium isotopes can be fed at high velocity through a slot-like nozzle to produce jets from which a portion of the fluid stream is peeled off or skimmed to enrich one of the fluid portions with the relatively heavier compounds of the uranium isotope of greater mass and the other fluid portion in the uranium isotopes of the lighter mass.

Such methods are used for $U^{235}$ enrichment, the component which preferentially contains the $U^{235}$ gaseous compounds being repeatedly subjected to such separation in a multiplicity of stages until the desired degree of enrichment is obtained.

The jet may be deflected along a curved path which results in a certain degree of separation within the stream of the heavy and light components and a stratification of these components within the stream so that, when the skimming or peel-off baffle intercepts only a portion of this stream, the two components into which this baffle separates the stream are relatively enriched in the heavier and lighter components.

For this type of separation, a passage-forming unit can be provided which has a substantially rectangular plane and cross-sectional configuration, i.e. can be generally in the form of a rectangular parallelepiped, with the passage being separated by partitions along which nozzle-forming cleats or strips are provided on one side to cooperate with curved flow-deflecting portions and peel-off strips forming skimming baffles which deflect the skimmed portion of the stream into the adjoining passage.

The nozzle-forming strips or cleats and the peel-off strips or cleats can have portions reaching into the flow-deflecting groove to form a discharge gap for the non-skimmed portion of the fluid between them.

The nozzle-forming edge of the nozzle strip defines with the curved wall of the flow-deflecting groove a slot-like constriction which constitutes the actual nozzle which accelarates the flow along the wall of the groove, a portion of the flow being intercepted by the edge of the peel-off baffle extending into the groove to recover the heavy component whereas the light fraction is discharged through the gap between the strips.

The passage-forming unit thus has alternating passages for the gas mixture to be separated and for the recovered heavy fraction.

Systems of this type function efficiently and effectively when the requisite geometry is ensured by precision fabrication and minimal tolerances. It has been found to be necessary to maintain tolerances of 0.01 mm and less for optimum operation (see German Pat. No. 24 19 192, column 2, lines 32 through 41).

In an earlier system operating under these principles (see German Pat. No. 11 98 328, FIGS. 3 and 4) the passage-forming partitions of the unit are independent structural elements held in place by end plates which simultaneously form corresponding inlet and outlet openings for the gas or vapor mixture to be separated and the recovered heavy phase.

The strips forming the nozzle edges and the peel-off strips are covers closing the passages.

As a result, the structure has numerous parts and it is difficult to maintain the narrow tolerances required for effective operation. From a practical point of view, moreover, it is difficult to maintain the required tolerances at a reasonable cost. During fabrication various uncontrolled errors can be introduced which are additive upon assembly of the apparatus and derive not only from the difficulty in fabricating a multiplicity of identical components but also from the greater difficulty of mounting, affixing or securing numerous elements in precisely the same manner in the unit.

OBJECTS OF THE INVENTION

It is the principal object of the present invention to provide an improved device or apparatus for the separation of gases or vapors in accordance with the mass of components thereof, whereby the problems discussed above are eliminated or reduced in significance.

Another object of this invention is to provide an isotope separation device which can be operated more efficiently than earlier systems for the same purpose, can be fabricated at comparatively low cost and which is of simpler construction.

Still another object of this invention is to provide a device for the purpose described which can be fabricated with high precision and which obviates the introduction of uncontrolled errors and deviations from tolerance requirements by assembly techniques.

SUMMARY OF THE INVENTION

These objects are attained, in accordance with the present invention, in a device for separating components of a gas or vapor mixture by mass which comprises a passage-forming unit in which the passages are separated from one another by partitions and a flow-deflecting groove together with nozzle-forming and peel-off strips or baffles is provided, but wherein the passage-forming unit is formed as a unitary structure in one piece having the partitions separating the passages from one another, the end walls closing alternate passages at opposite sides of the unit, the surfaces formed with the flow-deflecting grooves, and the walls along which the slot-like orifices of the passages are formed and the sufaces carrying the strips, as part of a single monolithic body.

The latter walls are provided adjoining each partition with a row of orifice-forming slots through which the gas or vapor is directed at the nozzle-forming baffle or a row of slots through which the skimmed fluid component is directed into a passage.

These walls also carry the surfaces or ledges upon which baffles are mounted directly so that the positions of the baffles relative to the flow-deflecting grooves which are unitarily formed in the monolithic body, are precisely determined.

The monolithic body can be formed by a variety of techniques without particular concern over precision except as to the aforementioned ledges and the flow-deflecting grooves. Thus the body can be cast and in a finishing operation, using precision machining, the ledges and flow-deflecting grooves can be fabricated.

Other foundry and forging techniques can be utilized for providing the basic structure of the monolithic body with the passages, partitions and end walls.

Obviously, since the strips or baffles are of very simple construction and can be fabricated with an extremely high degree of uniformity, e.g. from sheet metal, the tolerances can be established by the machining of the ledges and the flow-deflecting grooves which is also relatively simple and multiplying or additive errors of the type hitherto encountered are completely avoided.

The basic shape of the ledges and the flow-deflecting grooves can be provided during casting and the monolithic body can then be chucked and precision ground with appropriately shaped grinding wheels to effect the precision machining of the groove and ledge surfaces.

The casting can be of the die or pressure casting type or be simply pour-type casting.

The strips can be fabricated to especially high precision by galvanoplastic methods, e.g. electrodeposition.

With the system of this invention, the entire device can be fabricated with especially high precision since the precision intolerances do not depend upon assembling the passage-forming unit from a number of parts. As a result, the efficiency of the device is improved, the fabrication cost is reduced and an especially compact construction is obtained. The system can be stacked or utilized with unitary manifolds and heads for delivering or recovering gas as desired.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
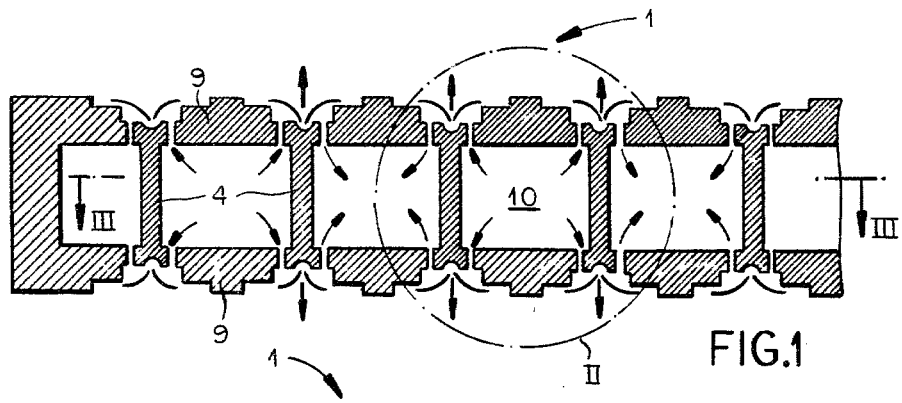
FIG. 1 is a cross section through a portion of a gas vapor separating device according to the present invention, shown somewhat diagrammatically.

The device shown in the drawing serves to separate by mass difference components of a fluid mixture in the form of gas or vapor, especially for isotopic enrichment in accordance with the principles described.

The device comprises a passage-forming unit 1, a multiplicity of nozzle-forming strips or baffles 2 and a corresponding number of peel-off or skimming strips, baffles or strips 3.

Figure 3:
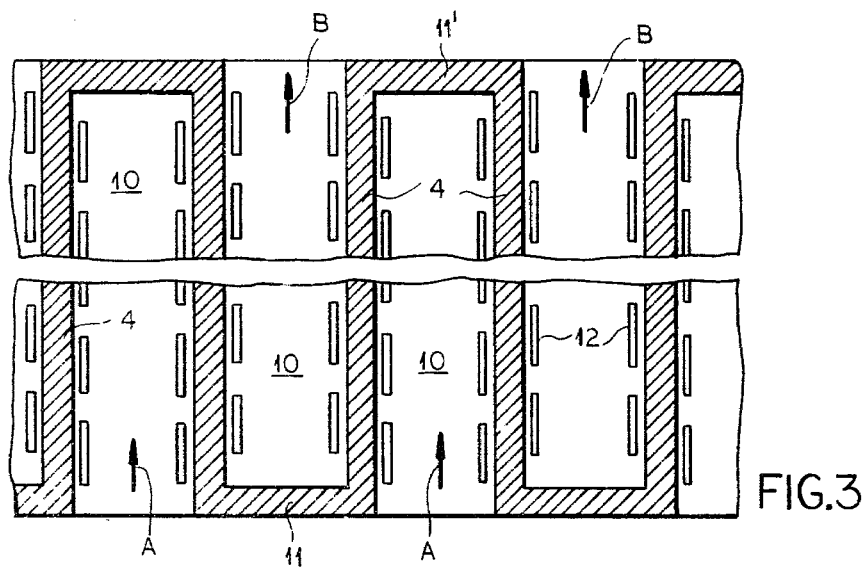
FIG. 3 is a section taken along the line III—III of FIG. 1.

The passage-forming unit 1 comprises a plurality of mutually parallel spaced-apart longitudinally extending partitions 4 which subdivide the interior into respective passages 10, some of these passages being closed at the bottom by walls 11 while alternate passages are closed at the top by wall 1' (see FIG. 3).

The wall portions coplanar with the partitions 4 are provided with longitudinally extending flow-guiding grooves 5 of rounded profile. The strips 2 and 3 have nozzle-forming edges 6 and skimming edges 7 which extend into the grooves 5, respectively, and define between them an outlet slot 8.

Figure 2:
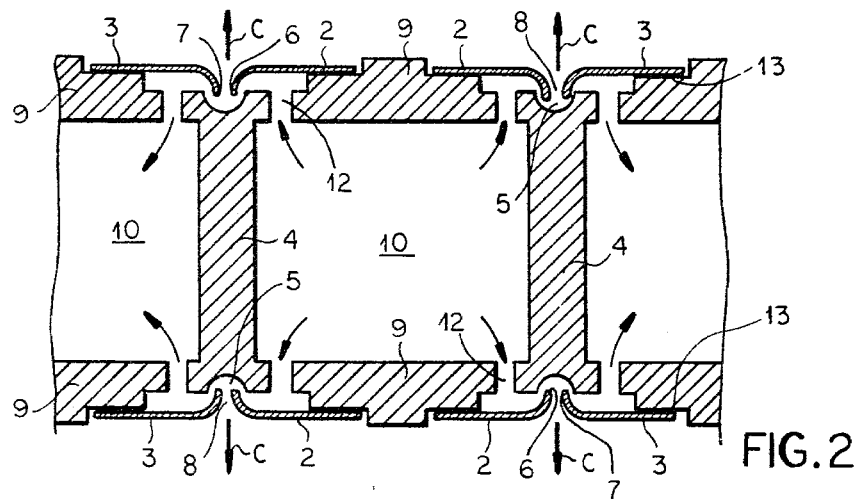
FIG. 2 is a detail view of the region II of FIG. 1 drawn to a larger scale.

As is clear from FIGS. 1 through 3, the passage-forming unit 1 is constituted as a monolithic block, i.e. is formed in one piece, with the end walls 11, 11', the opposite lateral walls 9 and the partitions 4. Preferably this block is cast, e.g. from cast iron or steel.

The passages 10 are, as noted, closed by the walls 9 laterally, these walls being unitary with the remainder of the block, while at the upper and lower sides, the passages 10 are alternately open and closed or closed and open, respectively, so that the gas mixture to be separated can be fed in the direction of arrows A from below into alternate passage while the heavy fraction passes upwardly in the direction of arrows B from the other passages 10 (see FIG. 3).

The lighter fraction is discharged in the direction of arrows C from the gaps 8.

The walls 9 are unitarily formed with slots 12 which open outwardly from the passage 10 along the partitions 4 and in rows parallel to the latter, the nozzle-forming strips 2 overhang these slots, to deflect the gas mixture along the curved wall of the groove 5 where a portion is skimmed by the baffles 3 and deflected through the slots 12 into the next passage.

The walls 9 which extend perpendicular to the partitions 4, are also provided with mounting surfaces or ledges 13 which are machined as are the grooves 5 so that the precision-formed strips 2 and 3 can be mounted directly on these ledges with the appropriate tolerance and spacing of the edges 6 and 7 from the wall of the groove 5. The slots 12 can be formed by sliders which are inserted into the casting mold while the grooves 5 and the ledges 13 can be roughly formed by the usual pattern and thereafter machined by any precision material-removal technique, e.g. precision grinding.

The passage-forming unit 1 can also be forged or produced by spark discharge machining (EDM) or like techniques while the baffles 3 are formed by electrodeposition.

Figure 4:
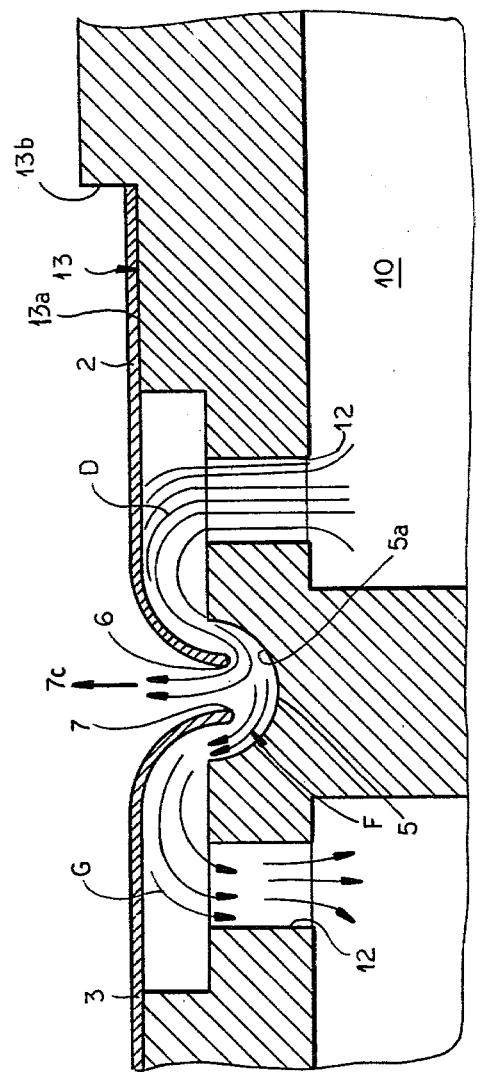
FIG. 4 is a diagram illustrating principles of the present invention.

The operating principle of the invention is shown diagrammatically in FIG. 4. The surfaces 13a and 13b of the ledge 13, which position the baffle 2, are precisely machined with respect to the surface 5a of the groove 5 so that the location of the edges 6 and 7 relative to the wall of groove 5 is precisely determined.

As is indicated in the flow lines in FIG. 4, the gas or vapor mixture to be separated passes under pressure through the slots 12 in the direction of arrows D and is accelerated in the gap formed by the edges 6 and 7 so that the heavier component tends to hug the wall as represented by arrows F while the lighter component passes in the direction of arrows C shown in FIG. 2 or arrow 7c shown in FIG. 4 from the gap between the baffles. The heavier component is skimmed by the arrows G into the slots 12 of the adjoining passage.

I claim:

1. A device for separating components of a gas or vapor fluid mixture by mass, comprising:

a one-piece monolithic passage-forming body generally in the form of a rectangular parallelepiped, said body being formed unitarily with a plurality of mutually parallel spaced-apart partitions with two adjacent partitions defining an elongated passage between them, respective end walls closing said passages alternately on opposite sides of said body, and said passages being closed laterally by opposite lateral walls perpendicular to said partitions and said end walls and disposed on opposite lateral sides of said body, each of said lateral walls being formed with elongated slots disposed on opposite sides of each partition and communicating with a respective passage adjacent a respective partition and extending parallel thereto, portions of said lateral walls which are coplanar with each partition being formed with an outwardly open flow-deflecting groove of curved cross section, each of said lateral walls being formed with an external mounting surface disposed on opposite sides of each groove outwardly of said slots;

a respective nozzle-forming strip reaching into each groove and disposed on each mounting surface of said lateral walls on one side of each groove so as to intercept said fluid mixture emerging from respective slots and direct said fluid mixture into and along a respective one of said grooves; and a respective skimming baffle reaching into each groove and mounted on said mounting surface opposite that on which said nozzle-forming strip is disposed so as to deflect a heavy component enriched fraction of said fluid mixture into an adjacent one of said passages through respective slots thereof, said baffle and the respective strip of each of said grooves defining a gap between them so as to permit a light component enriched fraction of said mixture to be discharged.

2. The device defined in claim 1 wherein said mounting surfaces are formed as ledges disposed outwardly of and parallel to the respective grooves.

3. The device defined in claim 2 wherein said body is a casting and said mounting surfaces and said grooves are precision machined in said casting.

4. The device defined in claim 1, claim 2 or claim 3 wherein each of said strips is a precision-formed member.

5. The device defined in claim 4 wherein each of said baffles and each of said strips is formed by precision electro-deposition.

* * * * *